US010095412B2

(12) United States Patent
Hsu et al.

(10) Patent No.: US 10,095,412 B2
(45) Date of Patent: Oct. 9, 2018

(54) MEMORY SYSTEM AND METHOD FOR IMPROVING WRITE PERFORMANCE IN A MULTI-DIE ENVIRONMENT

(71) Applicant: SanDisk Technologies Inc., Plano, TX (US)

(72) Inventors: Hua-Ling Cynthia Hsu, Fremont, CA (US); Abhijeet Manohar, Bangalore (IN); Victor Avila, Sunnyvale, CA (US); Tien-Chien Kuo, Sunnyvale, CA (US); Jong Hak Yuh, Pleasanton, CA (US)

(73) Assignee: SanDisk Technologies LLC, Plano, TX (US)

( * ) Notice: Subject to any disclaimer, the term of this patent is extended or adjusted under 35 U.S.C. 154(b) by 70 days.

(21) Appl. No.: 14/939,658

(22) Filed: Nov. 12, 2015

(65) Prior Publication Data

US 2017/0139590 A1 May 18, 2017

(51) Int. Cl.
G06F 12/00 (2006.01)
G06F 3/06 (2006.01)
G06F 12/0866 (2016.01)
G06F 1/32 (2006.01)

(52) U.S. Cl.
CPC ............ *G06F 3/061* (2013.01); *G06F 1/3225* (2013.01); *G06F 1/3275* (2013.01); *G06F 3/0653* (2013.01); *G06F 3/0659* (2013.01); *G06F 3/0685* (2013.01); *G06F 3/0688* (2013.01); *G06F 12/0866* (2013.01); *Y02D 10/13* (2018.01); *Y02D 10/14* (2018.01)

(58) Field of Classification Search
None
See application file for complete search history.

(56) References Cited

U.S. PATENT DOCUMENTS

| | | | | |
|---|---|---|---|---|
| 6,857,055 | B2 * | 2/2005 | Jeddeloh | G06F 1/28 361/91.1 |
| 7,843,758 | B2 * | 11/2010 | Byeon | G06F 13/1684 365/185.11 |
| 8,593,880 | B2 * | 11/2013 | Shibata | G11C 11/5628 365/185.11 |
| 8,929,169 | B1 | 1/2015 | Yang et al. | |
| 9,063,732 | B2 * | 6/2015 | Byom | G06F 1/3225 |
| 9,383,808 | B2 * | 7/2016 | Wakrat | G06F 1/3203 |
| 9,443,600 | B2 * | 9/2016 | Ghalam | G11C 16/30 |
| 9,536,617 | B2 * | 1/2017 | Al-Shamma | G11C 16/30 |
| 9,607,665 | B2 * | 3/2017 | Mirichigni | G11C 5/144 |

(Continued)

OTHER PUBLICATIONS

International Search Report and Written Opinion in corresponding International Application No. PCT/US2016/051528, dated Dec. 15, 2016, 15 pages.

*Primary Examiner* — John A Lane
(74) *Attorney, Agent, or Firm* — Brinks Gilson & Lione

(57) ABSTRACT

A memory system and method for improving write performance in a multi-die environment are disclosed. In one embodiment, a memory system is provided comprising a plurality of memory dies and a controller. The controller is configured to determine a programming status of each of the plurality of memory dies and dynamically adjust a maximum peak current limit of the plurality of memory dies based on the programming status of each of the plurality of memory dies. Other embodiments are provided.

17 Claims, 10 Drawing Sheets

(56) References Cited

U.S. PATENT DOCUMENTS

| | | | |
|---|---|---|---|
| 2003/0004604 A1* | 1/2003 | Goto | B30B 15/285 |
| | | | 700/178 |
| 2010/0039859 A1* | 2/2010 | Mokhlesi | G11C 11/5628 |
| | | | 365/185.03 |
| 2010/0191900 A1* | 7/2010 | Park | G06F 12/0246 |
| | | | 711/103 |
| 2011/0173462 A1 | 7/2011 | Wakrat et al. | |
| 2011/0320847 A1* | 12/2011 | Cheung | G06F 1/3225 |
| | | | 713/340 |
| 2014/0067139 A1* | 3/2014 | Berke | G06F 1/26 |
| | | | 700/291 |
| 2014/0075133 A1 | 3/2014 | Li et al. | |
| 2015/0098272 A1 | 4/2015 | Kasorla et al. | |
| 2015/0205540 A1* | 7/2015 | Yoo | G06F 3/0625 |
| | | | 711/103 |
| 2016/0071552 A1* | 3/2016 | Ohwada | H02J 9/061 |
| | | | 365/185.08 |
| 2016/0092116 A1* | 3/2016 | Liu | G11O 5/025 |
| | | | 711/103 |
| 2016/0179684 A1* | 6/2016 | Jung | G06F 12/0871 |
| | | | 711/103 |
| 2017/0069379 A1* | 3/2017 | Maeda | G11C 13/0069 |

* cited by examiner

| | IO7 | IO6 | IO5 | IO4 | IO3 | IO2 | IO1 | IO0 |
|---|---|---|---|---|---|---|---|---|
| CMD_7D | Chp.7 ongoing program | Chp.6 ongoing program | Chp.5 ongoing program | Chp.4 ongoing program | Chp.3 ongoing program | Chp.2 ongoing program | Chp.1 ongoing program | Chp.0 ongoing program |
| | 0: not program 1: ongoing program | 0: not program 1: ongoing program | 0: not program 1: ongoing program | 0: not program 1: ongoing program | 0: not program 1: ongoing program | 0: not program 1: ongoing program | 0: not program 1: ongoing program | 0: not program 1: ongoing program |
| F_MCM4n = 1, F_MCM2n = 1 | z | z | z | z | z | z | z | CADD = 0~7 |
| F_MCM4n = 1, F_MCM2n = 0 | z | z | z | z | z | z | CADD = 1,3,5,7 | CADD = 0,2,4,6 |
| F_MCM4n = 0, F_MCM2n = 1 | z | z | z | z | CADD = 3,7 | CADD = 2,6 | CADD = 1,5 | CADD = 0,4 |
| F_MCM4n = 0, F_MCM2n = 0 | CADD = 7 | CADD = 6 | CADD = 5 | CADD = 4 | CADD = 3 | CADD = 2 | CADD = 1 | CADD = 0 |

FIG. 10

MEMORY SYSTEM AND METHOD FOR IMPROVING WRITE PERFORMANCE IN A MULTI-DIE ENVIRONMENT

BACKGROUND

Some memory systems, such as solid-state drives (SSDs), contain one or more memory dies having blocks of memory that can be read or written in parallel. Memory systems typically have a maximum peak current limit. For example, some USB devices have a maximum peak current limit of 800 mA, while some SD cards have a maximum peak current limit of 400 mA. The limits can restrict the number of memory dies that can be operated in parallel. Further, in a multi-die environment, all memory dies are typically trimmed to program at the same speed regardless of how many dies are active at the same time. Some memory systems have a low-peak current mode that is activated with a special command (e.g., CMD_B2h), in which a lower peak value is set based on a ROM fuse parameter. This lower peak value is applied to all of the memory dies in the memory system and over the entire program operation.

BRIEF DESCRIPTION OF THE DRAWINGS

FIG. 10 is a chart showing a decoding scheme of an embodiment.

DETAILED DESCRIPTION

Overview

Figure 1A:
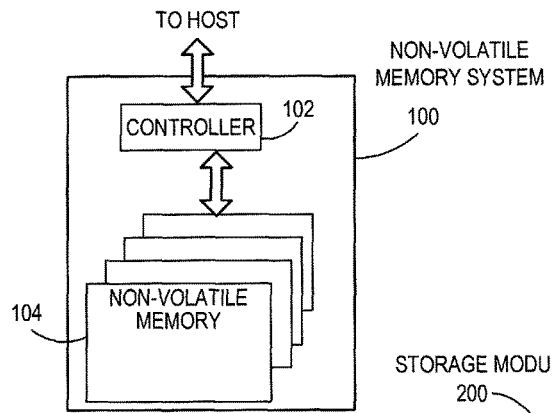
FIG. 1A is a block diagram of a non-volatile memory system of an embodiment.

By way of introduction, the below embodiments relate to a memory system and method for improving write performance in a multi-die environment. In one embodiment, a memory system is provided comprising a plurality of memory dies and a controller. The controller is configured to determine a programming status of each of the plurality of memory dies and dynamically adjust a maximum peak current limit of the plurality of memory dies based on the programming status of each of the plurality of memory dies.

In some embodiments, the controller is configured to determine the programming status of each of the plurality of memory dies by sending a broadcast status command to all of the memory dies and receiving an indication of programming status from each memory die.

In some embodiments, the controller is further configured to dynamically adjust the maximum peak current limit by broadcasting a new maximum peak current limit to the plurality of memory dies. In some embodiments, the new maximum peak current limit is contained in an address field.

In some embodiments, the controller is further configured to dynamically adjust the maximum peak current limit before issuing a next program sequence.

In some embodiments, the controller is further configured to dynamically adjust the maximum peak current limit during an ongoing program sequence.

In some embodiments, the controller is further configured to reset the maximum peak current limit.

In another embodiment, a method for improving write performance in a multi-die memory system. The method comprises determining which memory die(s) of the plurality of memory dies are active and allocating current from the current budget only to the memory die(s) that are active, wherein the memory die(s) that are active are allocated more than their pro rata share of the current budget, thereby increasing performance of those memory die(s).

In some embodiments, the determining is performed by sending out an inquiry to all of the memory dies and receiving an individual response from each memory die.

In another embodiment, a memory system is provided comprising a plurality of memory dies and a controller. The controller is configured to monitor the plurality of memory dies to determine how many of the plurality of memory dies are being programmed and make on-the-fly adjustments to change programming speeds of the memory dies that are being programmed based on how many of the plurality of memory dies are being programmed.

In some embodiments, the controller is configured to make the on-the-fly adjustments by dynamically increasing or decreasing a maximum peak current limit of the plurality of memory dies based on how many of the plurality of memory dies are being programmed.

In some embodiments, at least one of the plurality of memory dies comprises a three-dimensional memory. Also, in some embodiments, the memory system is embedded in a host, while, in other embodiments, the memory system is removably connected to a host.

Other embodiments are possible, and each of the embodiments can be used alone or together in combination. Accordingly, various embodiments will now be described with reference to the attached drawings.

Exemplary Embodiments

Figure 1B:
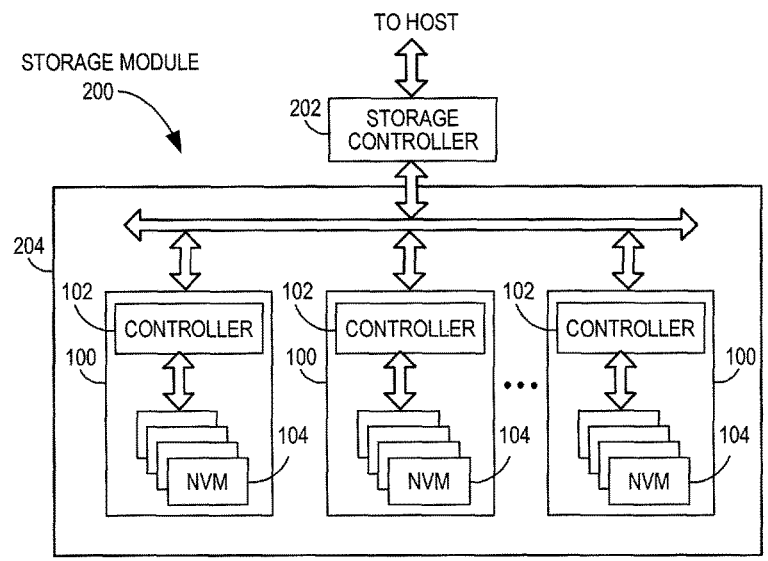
FIG. 1B is a block diagram illustrating an exemplary storage module of an embodiment.
Figure 1C:
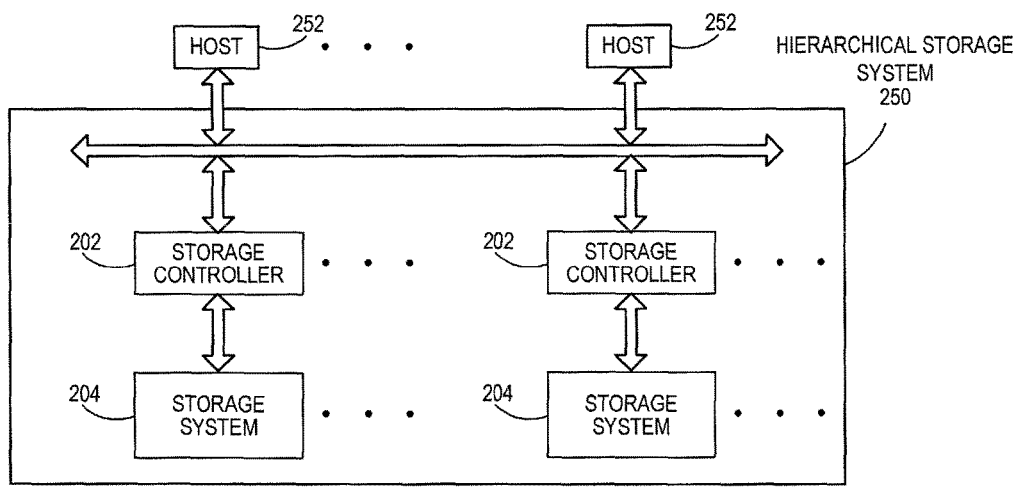
FIG. 1C is a block diagram illustrating a hierarchical storage system of an embodiment.

Memory systems suitable for use in implementing aspects of these embodiments are shown in FIGS. 1A-1C. FIG. 1A is a block diagram illustrating a non-volatile memory system 100 according to an embodiment of the subject matter described herein. Referring to FIG. 1A, non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although, in the example illustrated in FIG. 1A, non-volatile memory system 100 (sometimes referred to herein as a storage module) includes a single channel between controller 102 and non-volatile memory die 104, the subject matter described herein is not limited to having a single memory channel. For example, in some NAND memory system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
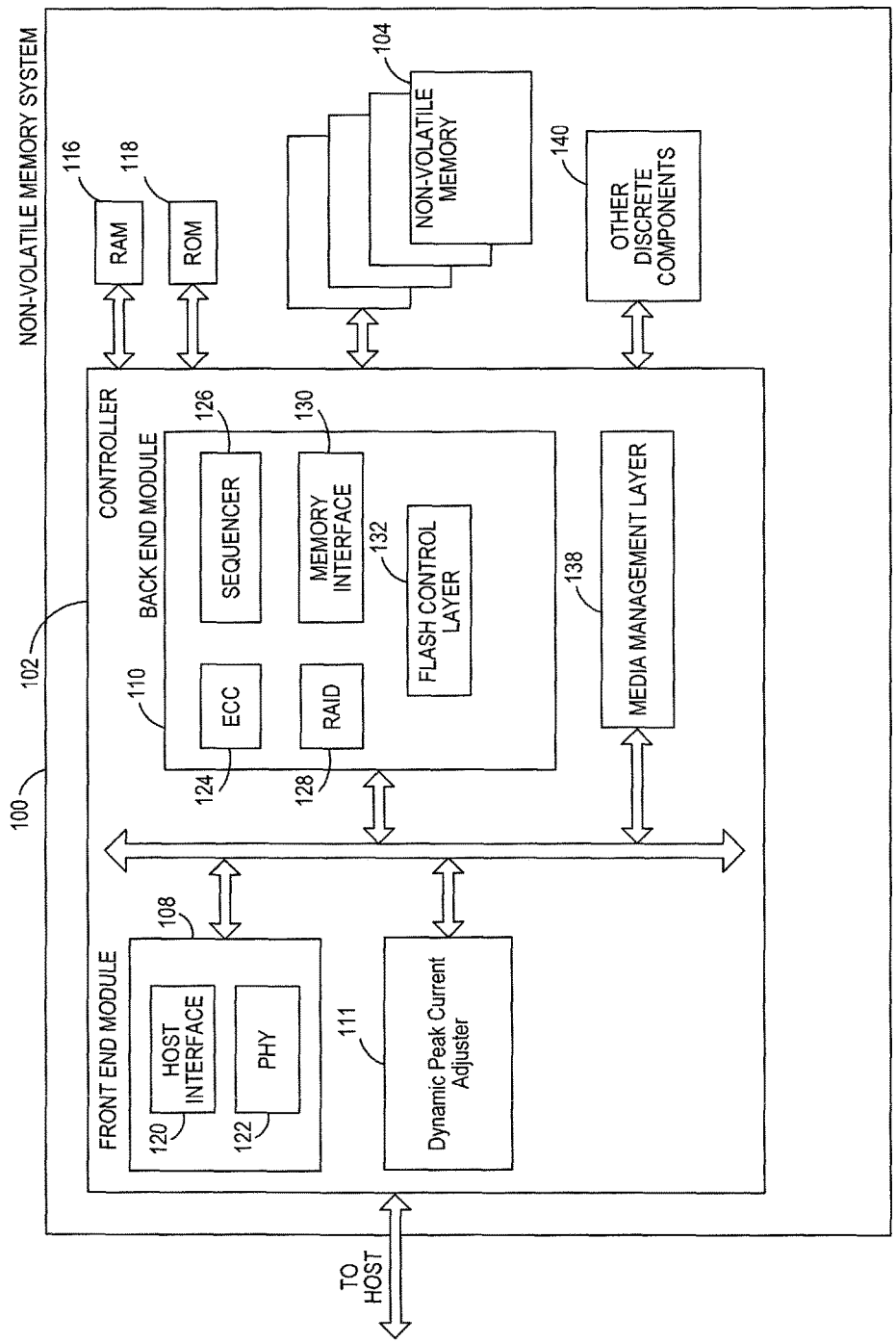
FIG. 2A is a block diagram illustrating exemplary components of the controller of the non-volatile memory system illustrated in FIG. 1A according to an embodiment.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a dynamic peak current adjuster 111, which is configured to dynamically adjust a maximum peak current limit of individual memory die(s) based on the programming status of each of the plurality of memory dies. Implementation of the functionality of these modules will be discussed in more detail below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The memory system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
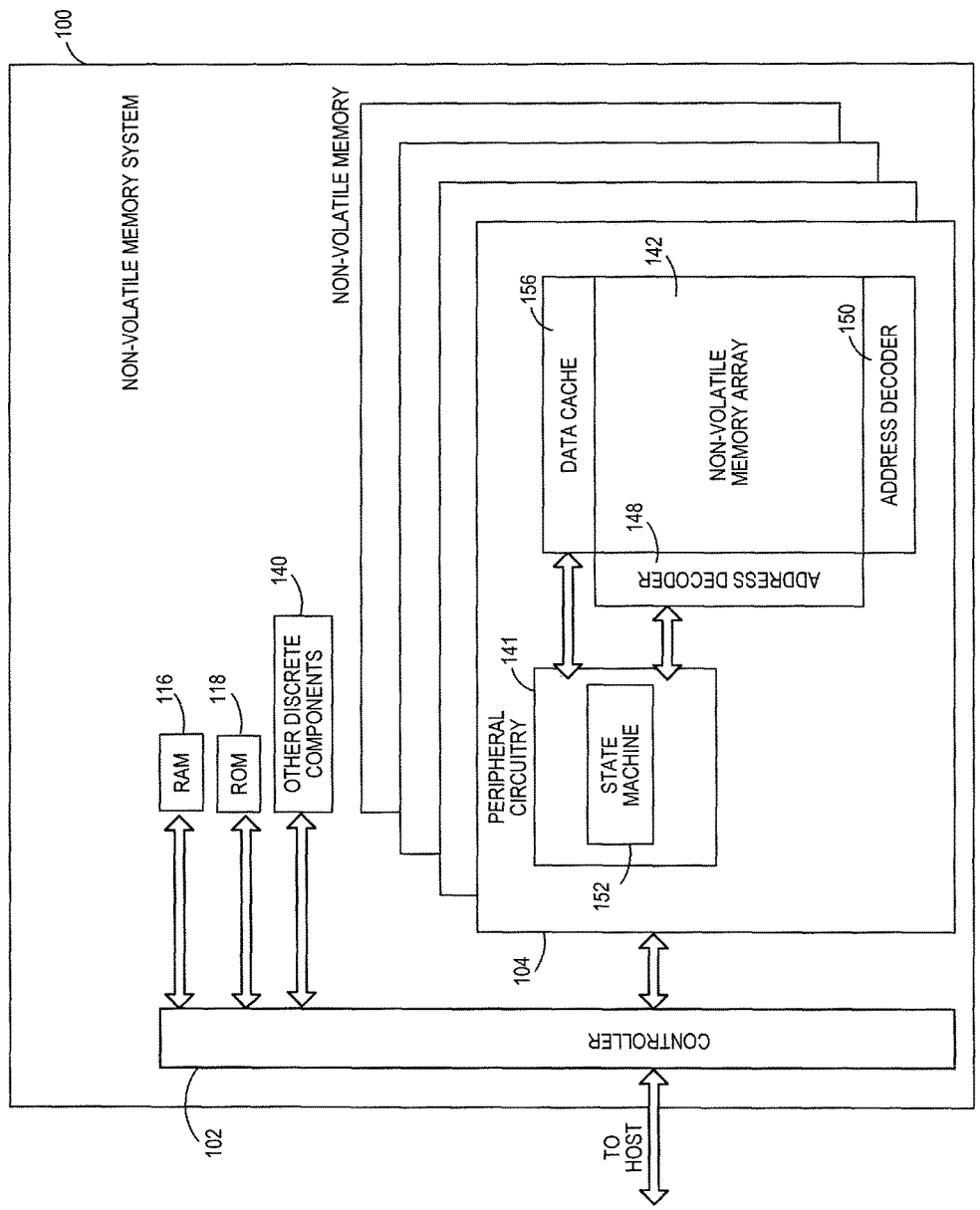
FIG. 2B is a block diagram illustrating exemplary components of the non-volatile memory storage system illustrated in FIG. 1A according to an embodiment.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

As discussed above, memory systems typically have a maximum peak current limit. For example, some USB devices have a maximum peak current limit of 800 mA, while some SD cards have a maximum peak current limit of 400 mA. These limits can restrict the number of memory dies that can be operated in parallel (in some memory systems, four dies). Further, in multi-die environments, all memory dies are typically trimmed to program at the same speed regardless of how many dies are active at the same time. Some memory systems have a low-peak current mode that is activated with a special command (e.g., CMD_B2h), in which a lower peak value is set based on a ROM fuse parameter. This lower peak value is applied to all of the memory dies in the memory system and over the entire program operation. As a result, in some memory systems with eight memory dies, only four of those memory dies can be programmed in parallel. In the following embodiments, the idle time of at least some of the memory dies can be utilized to improve performance (and can allow all eight memory dies to be programmed in parallel).

More specifically, in one embodiment, the plurality of memory dies 104 is associated with a current budget (i.e., an amount of current that can be consumed by the plurality of memory dies 104 over a period of time). The "current budget" can take any suitable form and can be defined by, for example, a maximum peak current limit for the plurality of memory dies 104. Of course, the "current budget" can be defined by other parameters. In one embodiment, the memory system 100 (e.g., the controller 102, the dynamic peak current adjuster 111, or some other component in the memory system 100) determines which memory die(s) of the plurality of memory dies 104 are active. A memory die can be "active" if it is undergoing or is about to undergo a program operation, for example. Of course, a memory die can be "active" under other criteria (e.g., erase or read). Next, the memory system 100 allocates current from the current budget only to the memory die(s) that are active. In this way, the memory die(s) that are active are allocated more than their pro rata share of the current budget, thereby increasing performance of those memory die(s). An example of this is shown in FIG. 3.

Figure 3:
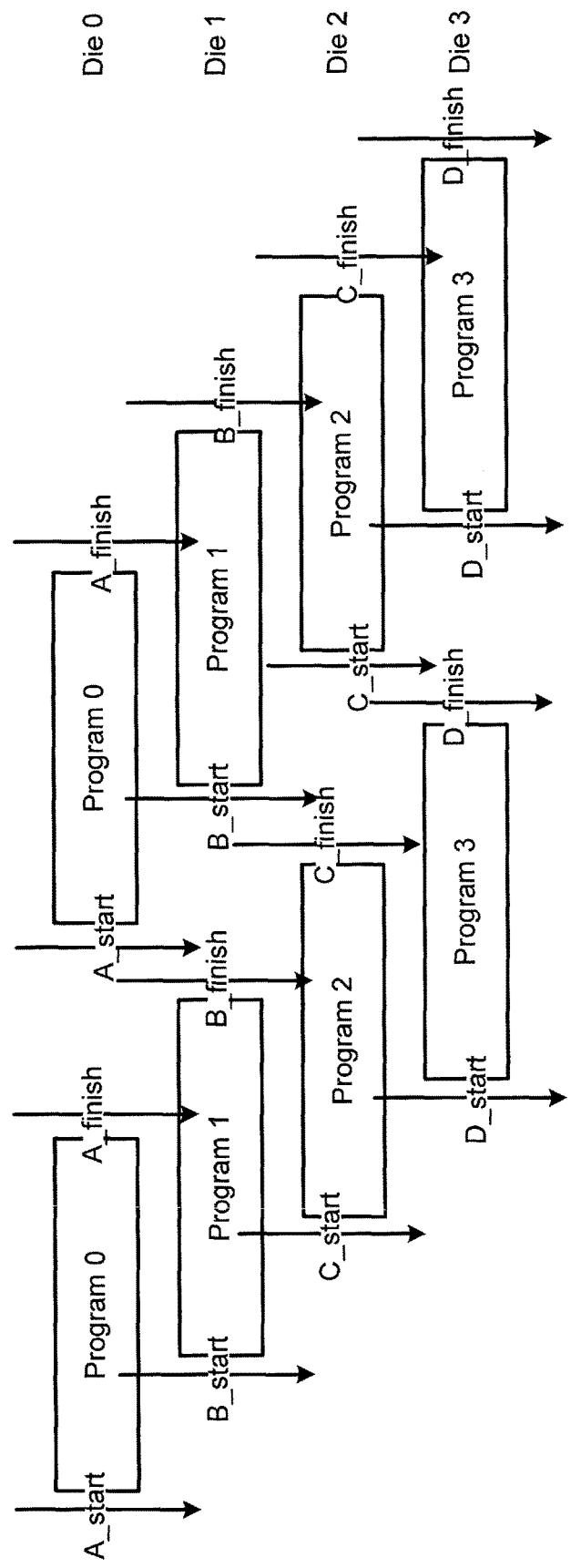
FIG. 3 is a diagram illustrating a method of an embodiment for improving write performance in a multi-die environment.

FIG. 3 shows a four-die environment with sequential program operations taking place on the four dies. In this example, the controller 102 of the memory system 100 determines which memory die(s) 104 are active by monitoring the program status of all the dies in the chip. For example, the controller 102 can issues a broadcast status command to all of the memory dies 102, in response to which, each memory die would return a status indicator indicating whether that particular memory die is currently being programmed. So, with reference to FIG. 3, A_start, B_start, C_start, and D_start represent the broadcast ongoing program status check just before the start of Die 0, Die 1, Die 2, and Die 3 programs, respectively. A_finish, B_finish, C_finish, and D_finish represent the broadcast ongoing program status check after the program operation has been completed on Die 0, Die 1, Die 2, and Die 3, respectively. With the knowledge of which memory dies are active/inactive, the controller 102 can allocate current from the current budget only to the memory die(s) that are active. In this way, the current that would have been allocated for consumption by the inactive (idle) die(s) is consumed by the die(s) that are programming, which increases performance for the active dies.

To illustrate this, let's assume the maximum current budget allowed during a program is 4× mA. At A_start, the entire budget of 4× can be allocated to Die 0. So, Die 0 would get more than its pro rata share of the current budget ("4×" versus just "×"). In this duration, the bit line (BL) pre-charge can be at its maximum. Before Die 1 begins to program, at B_start, the status now indicates that the current consumption needs to be reduced to 2× (with 2-dies). The bit line precharge current is accordingly reduced for both Die 0 and Die 1. This is repeated at C-start, where between C_start and A_finish, the consumption needs to be reduced to 4×/3. After this, Die 0 completes programming. So, between A_finish and D_start, the status check will indicate that the consumption can be increased back to 2×. At D_start, the budget again needs to be reduced to 4×/3 until B_finish, and so on. The per n-die current limit can be adjusted in the middle of a programming operation or at the start of a next programming operation. With increased bit line pre-charge current for program, the time required to complete the program operation is significantly reduced.

As can be seen from this example, the memory system 100 monitors the plurality of memory dies 104 to determine how many of the plurality of memory dies 104 are being programmed. The memory system 100 then makes on-the-fly adjustments to change programming speeds of the memory dies that are being programmed based on how many of the plurality of memory dies are being programmed. The status of the "number of ongoing program operations" can be checked at any time (including busy times). Hence, this method allows for flexible current consumption while keeping it under the maximum limit.

Figure 4:
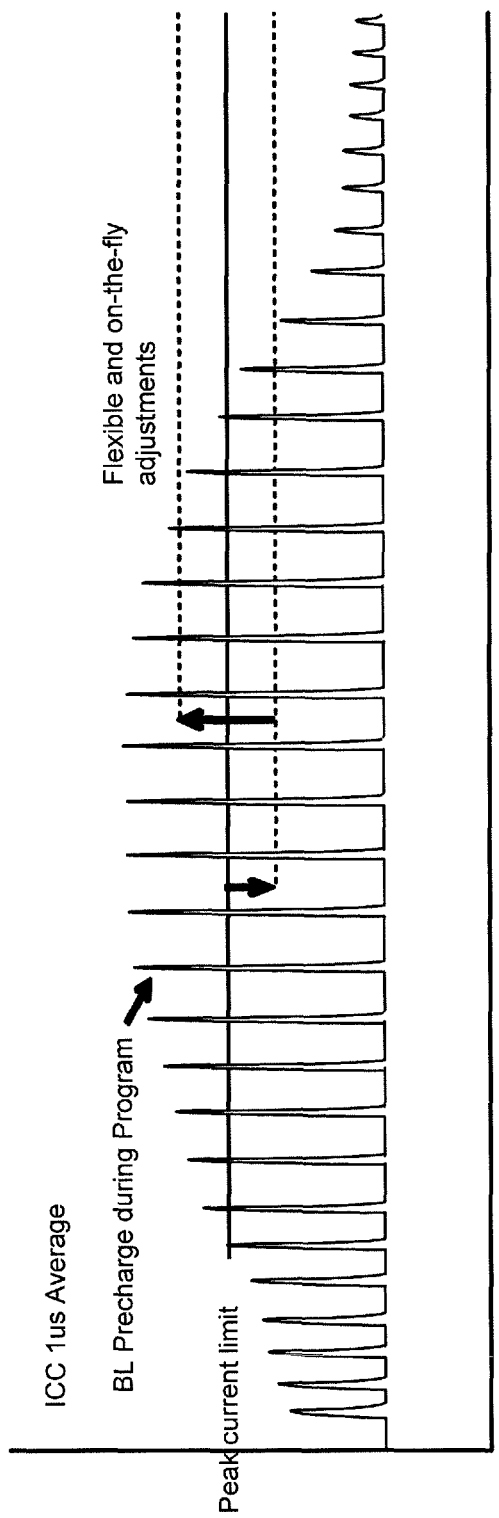
FIG. 4 is a diagram illustrating a method of an embodiment for dynamic manual control of maximum multi-die peak Icc.

One way in which to make on-the-fly adjustments is by dynamically increasing or decreasing a maximum peak current limit based on how many of the plurality of memory dies 104 are being programmed. This is illustrated in FIG. 4. FIG. 4 is a graph illustrating current consumption over time for one complete programming operation for one die. As shown in this graph, there is a peak current limit, which is typically fixed in prior memory systems.

As shown in FIG. 4, there is a "base line" of Icc that repeats over time. The high peaks represent bit line precharging during the program operation. Bit line pre-charging refers to the operation of pre-charging bit lines that will not be programmed during the program operation (e.g., because the bit lines contain erased data or because the bit lines contain written data that already passed its verify level). FIG. 4 shows that the profile of the bit line pre-charging peaks varies. The peaks start relatively low because, initially, the pre-charged bit lines are those that are not going to be programmed. Over time, data is programmed into other bit lines, and additional pre-charging is performed after the memory cells pass their verify level. The peaks in the middle of the graph are the highest due to bit-line-to-bit-line coupling. At the end of the graph, the peaks go down again because, at that point, most of the memory cells have been programmed, and neighboring bit lines are being precharged, which reduces the coupling effects.

Figure 5:
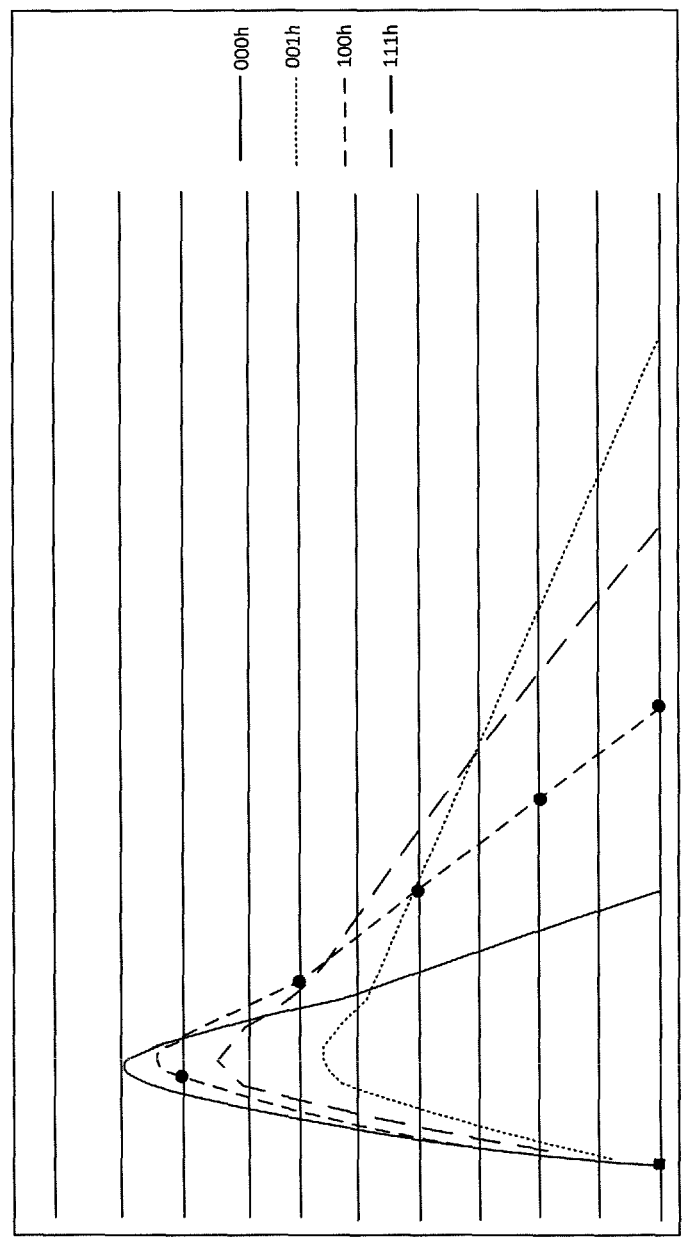
FIG. 5 is a graph of an embodiment showing that limiting peak current increases an amount of time to pre-charge a bit line.

In this embodiment, the memory die is not allowed to have any bit line pre-charging peaks over the peak current limit. Limiting the peak current in this way can result in lengthening the time needed for the pre-charge operation. This is shown in FIG. 5. FIG. 5 is a graph of current versus time for different peak current levels. As can be seen for several different peak current limits, the more the peak current is limited, the longer it takes to pre-charge a bit line, which causes the programming operation to take longer. For instance, in this particular example, there is a 5-microsecond difference between the highest and lowest peak current limit. In this way, adjusting the peak current limit causes the waveform to change in a time-self-adjusted manner to enhance performance of the memory system 100, as will be discussed below.

As can be seen in FIG. 5, with the lowest peak, the time taken to finish pre-charging the bit line is the highest. The peak budget shown in this graph is 45 mA. If this is increased to say 700 mA (for USB), then the x-axis will shrink significantly. Hence, by leveraging the package level peak Icc allowance, the circuit DAC range can be expanded to cover much higher peak values, and the resulting bit line pre-charge time reduction can be significant.

While FIG. 4 showed the peak current limit for single die, multi-die packages typically have a peak current limit for the entire package. To avoid exceeding this limit, all the dies in the package typically have the same peak current limit, which can result in an inefficient use of the memory. In this embodiment, instead of operating all the memory dies in a package with the same peak current limit, the controller 102 configures, on the fly, different memory dies with different peak current limits, which can result in better write performance. This is illustrated in FIG. 6.

Figure 6:
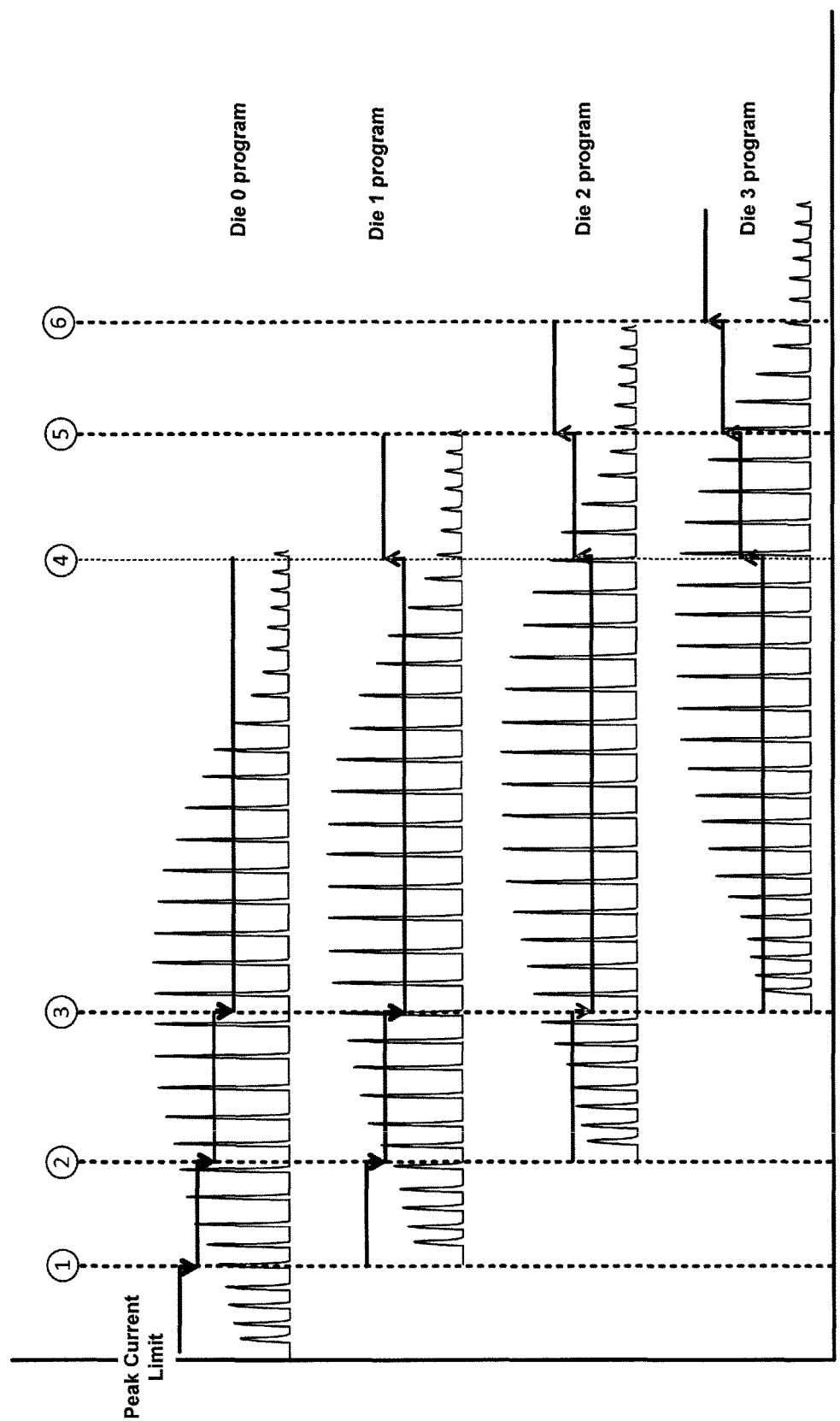
FIG. 6 is a graph of an embodiment showing how a peak current limit can be adjusted on the fly across several memory dies.

FIG. 6 shows four sequential, overlapping write operations across four memory dies. As first, only Die 0 is being programmed. So, the controller 102 dynamically adjusts the peak current limit of Die 0 to its maximum level (here, about four times the pro rata amount Die 0 would normally get). By having a high peak current limit, Die 0 can be programmed faster than normal, due to the phenomenon shown in FIG. 5. So, in the case of a random write where only one die is written to, the performance is optimal because the utilization of the entire current budget is possible.

At point 1 in the graph, Die 1 starts programming. So, at this point, there are two memory dies performing a program operation in parallel, and the controller 102 lowers the peak current limit for both memory dies (here, about two times the pro rata amount). At point 2, Die 2 starts programming, and the controller 102 lowers the peak current limit for all three memory dies. At point 3, Die 3 starts programming, and the controller 102 lowers the peak current limit, so now they all get their pro rata amount. So, up until this time, write performance was enhanced because the other three memory dies have a higher-than-normal peak current limit, which increased the write speed. At point 4, Die 0 completes its write operation and goes idle. Since Die 0 is not being programmed any more, the peak current limit can be increased for the other memory dies. The peak current limit is further increased at points 5 and 6 as other memory dies complete their write operations. As can be seen by this example, the controller 102 in this embodiment changes the peak current limit on the fly based on the programming status of each of the plurality of memory dies 104 (e.g., so that the maximum peak current budget is allocated among only those memory die(s) that are being programmed).

Figure 7:
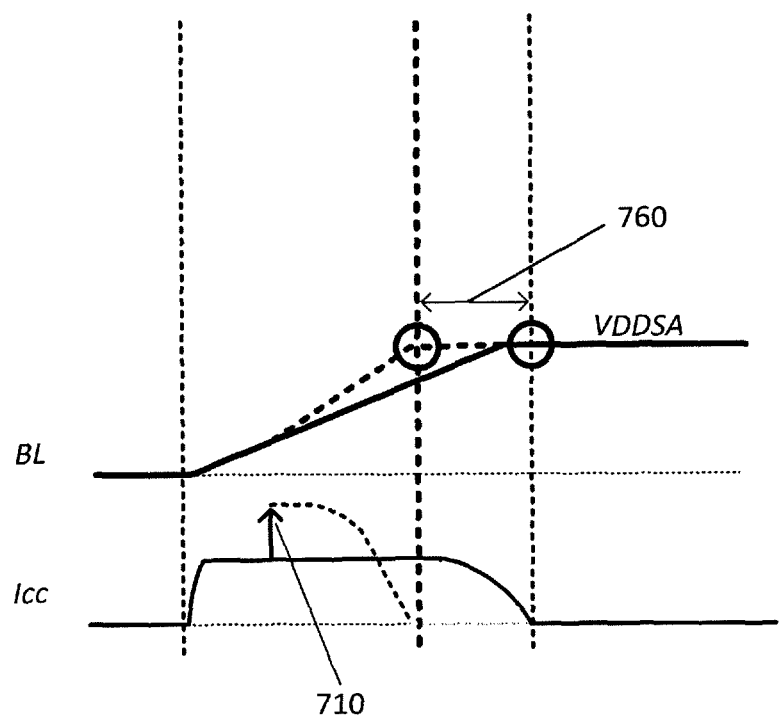
FIG. 7 is a graph of an embodiment showing how a time required for a bit line pre-charging operation can be increased when a peak current limit is adjusted on the fly.

It should be noted that the controller 102 can dynamically adjust the maximum peak current limit of individual memory die(s) before issuing a next program sequence or during an ongoing program sequence. If the adjustment is made during an ongoing program sequence, there can be an added delay to the programming operation. This is illustrated in the graph in FIG. 7. As shown in FIG. 7, for a given Icc, a bit line will pre-charge at a certain rate. When the Icc is limited, the bit line pre-charges at a slower rate (shown by the dotted lines). The bit line will eventually charge to the same level (here, the voltage level of the sense amp (VDDSA)), but the charging takes more time (here, about 100 ns).

Figure 8:
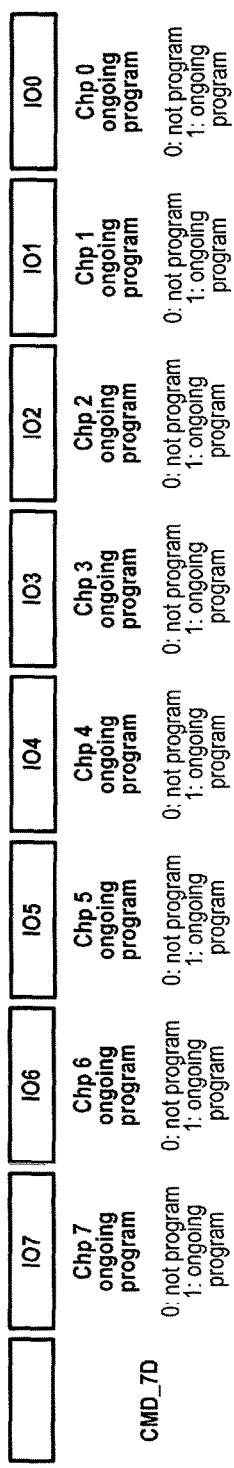
FIG. 8 is an illustration of a response to a broadcast command of an embodiment.

The controller 102 can monitor a programming status of each of the plurality of memory dies 104 in any suitable way. In one embodiment, the controller 102 monitors the programming status of each of the plurality of memory dies 104 by sending a broadcast status command to all of the memory dies 104 and receiving an indication of programming status from each memory die. As shown in FIG. 8, in one embodiment, in response to a broadcast status command (here, CMD=7D), each of the eight memory dies in the memory system 100 outputs its program status (here, 0 for not programming; 1 for programming) on different input-output pins on an 8-bit I-O bus. So, in response to a single request from the controller 102, all eight memory dies individually inform the controller 102 of their program status simultaneously. This allows the controller 102 to check the program status of all the memory dies 104 on one bus cycle. Of course, this is just one syntax, and other syntaxes can be used.

The controller 102 can issue the broadcast status command at any given time and at any given frequency. For example, the controller 102 can issue the broadcast status command when it has another program command to issue, when attempting to determine when an in-process program commend will finish, when trying to adjust the peak current limit, before setting a new peak current limit, periodically, etc.

The controller 102 can also use a broadcast command to dynamically adjust a maximum peak current limit of the memory dies 104. In this embodiment, the broadcast command is sent to all the memory dies—even the idle ones—and the peak current limit is the same for all the memory dies. So, the information is broadcast regardless of die selection, and the controller 102 uses one command to reflect all ongoing program operations. In another embodiment, the adjusted maximum peak current limit is only sent to the active memory dies. In yet another embodiment, different maximum peak current limits are sent to different memory dies. In any event, when a memory die receives its maximum peak current limit, it can store it within the memory dies for future reference and use. The original maximum peak current limit can be reset in the memory dies using a self-reset operation after the programming operation is complete, or the stored maximum peak current limit can be overwritten the value of the original (or different) limit (with or without cache). In one embodiment, the reset (e.g., back to the ROM fuse default trim) can occur upon a read or erase operation, instead of or in addition to a write operation finishing. Also, the set condition of CMD_B6 can be blocked by a read/erase operation In one exemplary implementation, the command to broadcast the adjusted maximum peak current limit is referred to a CMD_B6 command, and the value of the maximum peak current limit is sent in the address field. The advantage of this syntax is that the command and address fields may run in the same mode (legacy mode). In contrast, if the value of the maximum peak current limit were sent in the data field, the memory die may need to switch from legacy mode to toggle mode. Of course, this is just one exemplary syntax, and other syntaxes can be used.

Figure 9:
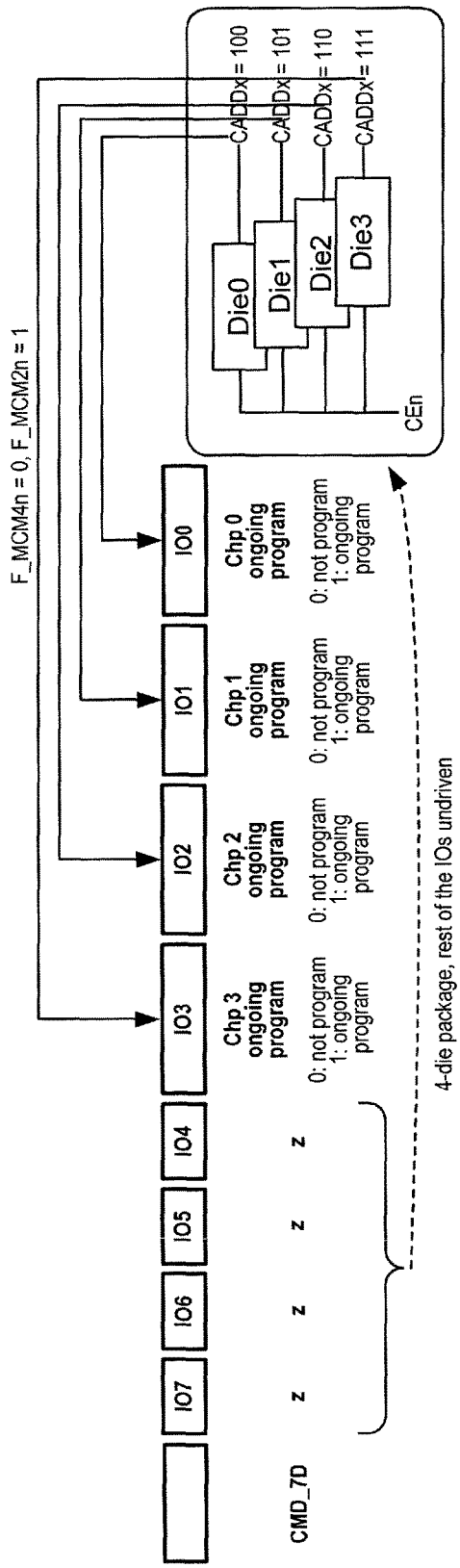
FIG. 9 is an illustration of an alternative syntax of an embodiment.

In the above example, the memory system 100 has 8 memory dies, each providing its status on a single bit of an 8-bit bus. If the memory system 100 has fewer than 8 memory dies, a mapping operation can be used, as illustrated in FIGS. 9 and 10. As shown in FIG. 9, with a less-than-eight-die package, the unavailable IO bits will be undriven. In this embodiment, a chip address decoding system is used where bits of a chip address (CADD) are used to provide a chip enable signal to the appropriate bit on the bus. FIG. 10 is a chart that summarizes the decoding discussed above.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A memory system comprising:
a plurality of memory dies; and
a controller in communication with the plurality of memory dies, wherein the controller is configured to:
perform the following before and after a program operation of each memory die:
send a broadcast status command to the plurality of memory dies;
receive an indication of programming status from each of the plurality of memory dies in response to the broadcast status command; and
dynamically adjust a maximum peak current limit of the plurality of memory dies based on the indication of programming status received from each of the plurality of memory dies such that memory dies whose programming status is active receive a higher maximum peak limit than those memory dies whose programming status is inactive.

2. The memory system of claim 1, wherein a new maximum peak current limit for a memory die is contained in an address field in a message sent to the memory die.

3. The memory system of claim 1, wherein the controller is further configured to dynamically adjust the maximum peak current limit before issuing a next program sequence.

4. The memory system of claim 1, wherein the controller is further configured to dynamically adjust the maximum peak current limit during an ongoing program sequence.

5. The memory system of claim 1, wherein the controller is further configured to reset the maximum peak current limit.

6. The memory system of claim 1, wherein at least one of the plurality of memory dies comprises a three-dimensional memory.

7. The memory system of claim 1, wherein the memory system is embedded in a host.

8. The memory system of claim 1, wherein the memory system is removably connected to a host.

9. A method for improving write performance in a multi-die memory system, the method comprising:
performing the following before and after a program operation of each memory die in a memory system comprising a plurality of memory dies, wherein the plurality of memory dies is associated with a current budget:
sending a broadcast status command to the plurality of memory dies;
receiving an indication from each memory die as to whether each memory die is active in response to the broadcast status command; and
allocating current from the current budget only to the memory die(s) that are active, wherein the memory die(s) that are active are allocated more than their pro rata share of the current budget, thereby increasing performance of those memory die(s).

10. The method of claim 9, wherein at least one of the plurality of memory dies comprises a three-dimensional memory.

11. The method of claim 9, wherein the memory system is embedded in a host.

12. The method of claim 9, wherein the memory system is removably connected to a host.

13. A memory system comprising:
a plurality of memory dies;
means for sending a broadcast status command to the plurality of memory dies before and after a program operation of each memory die;
means for receiving indications from the plurality of memory dies in response to the broadcast status command to determine how many of the plurality of memory dies are being programmed; and
means for making on-the-fly adjustments to change programming speeds of the memory dies that are being programmed based on how many of the plurality of memory dies are being programmed.

14. The memory system of claim 13, wherein the controller is configured to make the on-the-fly adjustments by dynamically increasing or decreasing a maximum peak current limit of the plurality of memory dies based on how many of the plurality of memory dies are being programmed.

15. The memory system of claim 13, wherein at least one of the plurality of memory dies comprises a three-dimensional memory.

16. The memory system of claim 13, wherein the memory system is embedded in a host.

17. The memory system of claim 13, wherein the memory system is removably connected to a host.

* * * * *